(12) United States Patent
Kitagawa et al.

(10) Patent No.: US 6,264,855 B1
(45) Date of Patent: Jul. 24, 2001

(54) PROCESS FOR PREPARING WATER RESISTANT LUMINOUS PIGMENTS

(75) Inventors: Yosuke Kitagawa; Ryuichi Hoshikawa, both of Kyoto (JP)

(73) Assignee: Matsui Shikiso Chemical Co., Ltd., Kyoto (JP)

(*) Notice: Subject to any disclaimer, the term of this patent is extended or adjusted under 35 U.S.C. 154(b) by 0 days.

(21) Appl. No.: 09/445,797

(22) PCT Filed: Oct. 7, 1999

(86) PCT No.: PCT/JP99/05541

§ 371 Date: Dec. 10, 1999

§ 102(e) Date: Dec. 10, 1999

(87) PCT Pub. No.: WO01/27220

PCT Pub. Date: Apr. 19, 2001

(51) Int. Cl.[7] ............................ C09K 11/08; C09K 11/64; C09C 1/40; C09C 1/02; C09C 3/06

(52) U.S. Cl. ........................... 252/301.4 R; 252/301.4 P; 252/301.6 R; 252/301.6 P; 427/215; 428/403; 428/404

(58) Field of Search ............... 252/301.4 P, 301.4 R, 252/301.6 P, 301.6 R; 427/215; 428/403, 404; 264/21

(56) References Cited

U.S. PATENT DOCUMENTS 2,691,601 * 10/1954 Butler et al. .................. 252/301.4 R
5,376,303   12/1994 Royce et al. ................. 252/301.4 R
5,424,006    6/1995 Murayama et al. ........... 252/301.4 R

FOREIGN PATENT DOCUMENTS

| 2543825 | 11/1964 | (JP) . |
| 2697688 | 11/1964 | (JP) . |
| 2697733 | 11/1964 | (JP) . |
| 9-143463 | 6/1995 | (JP) . |
| 07292282 A | 7/1995 | (JP) . |
| 7292282 A * | 11/1995 | (JP) . |
| 10273654 A | 10/1998 | (JP) . |
| 11140438 A * | 5/1999 | (JP) . |
| 11140439 A * | 5/1999 | (JP) . |

* cited by examiner

Primary Examiner—C. Melissa Koslow
(74) Attorney, Agent, or Firm—Dinnin & Dunn P.C.

(57) ABSTRACT

A process for preparing a water resistant luminous pigment with durability, characterized in that a luminous pigment, in which an oxide matrix comprising at least one element selected from the group consisting of Mg, Ca, Sr, Ba and Zn and at least one element selected from the group consisting of B, Al, P and Ga is doped with at least one rare-earth metal element, is allowed to an acid treatment under the condition of pH of not more than 3 using at least one acidic compound selected from the group consisting of acids and acid generating compounds, and is subsequently allowed to an alkaline treatment under the condition of pH 4–9 using at least one alkaline compound selected from the group consisting of alkalis and alkali generating compounds.

10 Claims, No Drawings

PROCESS FOR PREPARING WATER RESISTANT LUMINOUS PIGMENTS

TECHNICAL FIELD

The invention relates to a process for preparing a water resistant luminous pigment.

BACKGROUND ART

A luminous pigment means a pigment having the ability to keep luminescence in a high luminance for a given length of time even in case of keeping it in a dark place after irradiation with light, and is also called a light-storage pigment.

Conventionally, various kinds of pigments are known for such luminous pigments in which a metal sulfide such as calcium sulfide, zinc sulfide, cadmium sulfide or the like is doped with copper, bismuth or the like. However a duration time of luminescence in a dark place is short, and these pigments cannot help being used under an extremely restricted condition.

To improve this point attempts have been made in which various radioactive substances are added to the above compounds, but it was extremely restricted from the safety point of view, because the effect to a human body due to the use of the radioactive substances cannot be neglected.

Consequently, as those having no such defects, and having a long luminous time in a dark place and further no safety problem, luminous pigments consisting of compounds, which are made of some kind of metal oxides doped with rare-earth metal elements, were developed (JP, A, H9-143463, Japanese Patent No. 2543825, Japanese Patent No. 2697733, Japanese Patent No. 2697688).

However, it was found that such luminous pigments have a fatal disadvantage in that they are easily decomposed in the presence of water. This problem cannot be solved by merely changing the type of a vehicle component. These pigments lose a luminous effect by moisture adsorption, condensation or the like regardless of an outdoor or indoor use, and it was a fact that said pigments could not practically be used while retaining their properties.

Recently, water resistant pigments were thus developed (JP, A, H10-273654, Japanese Patent No. 2929162). Especially, the patented invention of the Japanese Patent No. 2929162 by the present inventors, relates to water resistant luminous pigments, in which a metal oxide is doped with a rare-earth metal element, and then treated by at least one compound of acids and acid generating substances.

However, it has been found that it lost water resistance when used at a high temperature for a long period of time, though there is no particular problem in its use under ordinary temperature, and thus, it became necessary to undertake the solution.

DISCLOSURE OF THE INVENTION

The invention has an object to provide a water resistant luminous pigment with durability.

The inventors have made intensive studies to solve the above problems, and found that a luminous pigment, consisting of a compound, made of metal oxide doped with a rare-earth metal element, when treated with acid (Japanese Patent No. 2929162), and then followed by a further alkaline treatment under certain conditions, results in an increase of the durability in the water resistance. As a result of further studies the inventors have accomplished the invention.

Namely, the present invention relates to the following:

(1) A process for preparing a water resistant luminous pigment, characterized in that a luminous pigment, in which an oxide matrix comprising at least one element selected from the group consisting of Mg, Ca, Sr, Ba and Zn and at least one element selected from the group consisting of B, Al, P and Ga is doped with at least one rare-earth metal element, is acid treated under the condition of a pH of not more than 3 using at least one acidic compound selected from the group consisting of acids and acid generating compounds, and is subsequently given an alkaline treatment under the condition of a pH of 4–9 using at least one alkaline compound selected from the group consisting of alkalis and alkali generating compounds.

(2) A process for preparing a water resistant luminous pigment according to (1) above, wherein the luminous pigment has the following formula:

$MAl_2O_4{:}R$ or $M_4Al_{14}O_{25}{:}R$ in which

M is at least one element selected from the group consisting of Ca, Sr and Ba;

R is at least one element selected from the group consisting of Tb, Dy, Nd, Eu and Tm.

(3) A process for preparing a water resistant luminous pigment according to (2) above, wherein R comprises at least one element selected from the group consisting of Tb, Dy, Nd and Tm, and Eu.

(4) A process for preparing a water resistant luminous pigment according to (1), (2) or (3) above, wherein the acidic compound is at least one compound selected from the group consisting of phosphoric acid, phosphorous acid, polyphosphoric acid, sodium dihydrogenphosphate or sulfuric acid.

(5) A process for preparing a water resistant luminous pigment according to (1), (2), (3) or (4) above, wherein the alkaline compound is at least one compound selected from the group consisting of sodium hydroxide, potassium hydroxide, calcium hydroxide, strontium hydroxide, lithium hydroxide, trisodium phosphate or strontium oxide.

The invention is based on a new finding that surprisingly, a durability of a water resistance increases and a heat resistance is also given when a pigment disclosed in Japanese Patent No. 2929162 made by the present inventors is further treated under a particular alkaline condition.

Although the water resistance of the pigment disclosed in Japanese Patent No. 2929162 is given by the acid treatment, it is presumed that, the water resistance is caused by a formation of a water resistant membrane on the surface of the luminous pigment by reacting an acidic compounds with a metal oxide of the pigment component.

Then, as to the increase of durability of the water resistance in the present invention, it is regarded that a water resistant membrane formed on the surface of a luminous pigment is all the more strengthened because of the alkaline treatment in the invention, and as a result, the durability of said membrane is increased and the heat resistance is also given.

In any event, the invention is aiming at the durability of the water resistance of luminous pigments by applying a particular alkaline treatment to those diclosed in Japanese Patent No. 2929162.

Therefore, the luminous pigment of the present invention has not only a durability for its water resistance, but is also endurable at high temperature for long periods of time, and can be used under any environment.

Consequently, a water resistant luminous pigment of the present invention can be used in any industrial and technical field and is very useful as described below.

EMBODIMENT FOR CARRYING OUT THE INVENTION

Embodiments for carrying out the invention are further described in detail in the following.

A water resistant luminous pigment with durability in the present invention can be prepared by an acid treatment of a luminous pigment, as a starting material, with at least one acidic compound selected from the group consisting of acids and acid generating compounds under the condition of pH of not more than 3, and subsequently by an alkaline treatment with at least one alkaline compound selected from the group consisting of alkalis and alkali generating compounds under the condition of pH 4–9.

1 Luminous Pigments

A luminous pigment as an object of an acid treatment can be any type if it is a luminous pigment in which an oxide matrix comprising at least one element selected from the group consisting of Mg, Ca, Sr, Ba and Zn, and at least one element selected from the group consisting of B, Al, P and Ga is doped with at least one rare-earth metal element.

As such a luminous pigment is illustrated as having a kind of ceramic structure in which an oxide matrix comprising at least one element selected from the group consisting of Mg, Ca, Sr, Ba and Zn, and at least one element selected from the group consisting of B, Al, P and Ga is mixed with at least one rare-earth metal element selected from the group consisting of Sc, Y, La, Ce, Pr, Nd, Sm, Eu, Gd, Tb, Dy, Ho, Er, Tm, Yb and Lu and sintered.

An amount of the rare-earth element to be doped is not particularly restricted, but it is enough in 0.0001–30% by weight, preferably 0.1–10% by weight relative to the total amount of the luminous pigment.

Preferred examples of a luminous pigment of the invention are illustrated by the following formulas:

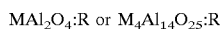

$MAl_2O_4$:R or $M_4Al_{14}O_{25}$:R wherein

M is at least one selected from the group consisting of Ca, Sr and Ba, and

R is at least one selected from the group consisting of Tb, Dy, Nd, Eu and Tm. In particular, R preferably comprises at least one selected from the group consisting of Tb, Dy, Nd and Tm; and Eu.

A luminous pigment of the invention can contain not only the metal oxides and the rare earth elements, but a simple substance such as Fe, Ni, Co, Si and the like, or each kind of compound in a degree not influencing a bad effect, and usually, in a luminous pigment they can be contained up to approximately 5% by weight.

In the invention, the particle diameter of a luminous pigment is not particularly restricted, though it may be 0.5–200 μm, preferably 1–50 μm by considering a luminous performance, readiness of its application to each kind of use, or the like.

2 Acid Treatment

An acid treatment is carried out using at least one acidic compound selected from the group consisting of acids and acid generating compounds under the condition of pH of not more than 3.

By this acid treatment the water resistance of a luminous pigment increases tremendously, and even in the presence of water a luminous effect of high luminance can be obtained in a dark place for a long period. The reason is that metal oxide of a luminous pigment component is reacted with an acidic compound used for the acid treatment to form a reaction product on a surface part of said pigment, which is insoluble or hardly soluble in water, and it is provably due to a water resistant structure in which the surface of said pigment is covered by an insoluble or hardly soluble substance.

An acidic compound used for the acid treatment in the invention may be any substance whatsoever if it has ability to form a water resistant membrane by reacting with metal oxide of a luminous pigment component, and can be appropriately selected according to a kind of a luminous pigment.

Illustratives of the acid used for the acid treatment in the invention are, for example, sulfuric acid, sulfurous acid, nitric acid, hydrochloric acid, carbonic acid, silicic acid, boric acid, phosphoric acid, phosphorous acid, polyphosphoric acid, sodium dihydrogenphosphate, sodium hexametaphosphate, acetic acid, propionic acid, butyric acid, caprylic acid, lauric acid, stearic acid, acrylic acid, methacrylic acid, oxalic acid, succinic acid, malic acid, citric acid, tartaric acid, adipic acid, azelaic acid, sebacic acid, benzoic acid, phthalic acid, salicylic acid, gallic acid, phenol, naphtoic acid, benzenesulfonic acid, toluenesulfonic acid, metanilic acid, taurine, ascorbic acid, lactic acid, silanolic acid, phosphonic acid, crotonic acid, maleic acid or the like.

Further, as the acid generating compound salts or acid anhydrides of the above acids, or the like can be used. As the salts, for example, sodium salts, potassium salts, ammonium salts or the like can be used, and as the acid anhydrides any acid anhydride, which can be formed from the above acids, can be used.

As the acidic compound of the invention, preferably phosphoric acids such as phosphoric acid, phosphorous acid, polyphosphoric acid or sodium dihydrogenphosphate, phosphoric acid type compounds consisting of salts thereof, and sulfuric acid may be used, though in particular phosphoric acid derivatives may most preferably be used.

Further, in the invention, the above acids or the acid generating compounds can be used in each independently or in a combination of two or more species.

The acid treatment in the invention is not particularly restricted, and various kinds of method can be adopted as far as it is concerned with a treatment under the condition of pH of not more than 3 by employing at least one acidic compound selected from the group consisting of acids and acid generating compounds; e.g. a method in which a luminous pigment is dipped in an aqueous solution containing an acidic compound, a method in which an aqueous solution containing an acidic compound is sprayed to a luminous pigment, and a method in which an acidic compound is contacted to a surface of a luminous pigment under the atmosphere of a high humidity. Among these methods the method in which a luminous pigment is dipped in an aqueous solution containing an acidic compound is preferable in the point that procedure is simple and reaction can be carried out efficiently.

In the following, while one embodiment of the treatment method of dipping a luminous pigment in an aqueous solution containing an acidic compound is illustrated, the treatment method of the invention is not limited thereto.

First, water of 1–1000 times by weight, preferably 2–100 times by weight, more preferably 3–10 times by weight against a luminous pigment is prepared, and the above acidic compound is dissolved so that the concentration becomes to about 0.01–30% by weight, preferably about 0.5–10% by weight. On this occasion a part of water as the above reaction medium can be replaced by a water-soluble organic solvent such as methanol, ethanol, acetone, dioxane, dimethylformamide (DMF) or dimethyl suloxide (DMSO) in order to adjust solubility of the acidic compound. While an amount used for the organic solvent is not particularly restricted and may be a range which does not inhibit reaction between metal oxide of a luminous pigment component and the acidic compound, though usually, it is appropriate to use in less amount compared with that of water. In this aqueous solution a surfactant can also be added to increase dispersiveness of the luminous pigment. A type and a used amount of a surfactant can appropriately adjusted according to a type and an amount of the luminous pigment used.

Subsequently, the luminous pigment is added to an aqueous solution containing the acidic compound and homogeneously dispersed under stirring to react with the acidic compound and metal oxide of the luminous pigment component. The treating temperature in this occasion is not particularly restricted, though it is usually not less than 20° C., preferably in the range of 50° C.-less than boiling point. The treating time is 0.5–120 min., preferably 10–60 min.

3 Alkali Treatment

An alkali treatment is carried out using at least one of alkaline compounds consisting of alkali or an alkali generating compound under the condition of pH 4–9, preferably 4–7. If it deviates from this range, the object of the invention can not be attained.

By a particular alkali treatment of the invention durability of water resistance of a luminous pigment accomplished by the above acid treatment is increased, and its water resistance is kept at high temperature for long use. It is estimated that the reason is that a water resistant membrane formed on the surface of a luminous pigment which is formed by the acid treatment is transformed to a more strengthened one by a special alkaline treatment.

As alkali in an alkali treatment can be used sodium hydroxide, potassium hydroxide, lithium hydroxide, calcium hydroxide, strontium hydroxide, ammonia or the like, though using sodium hydroxide is preferable. Additionally, as an alkali generating compound can be used trisodium phosphate, disodium hydrogenphosphate, sodium hexametaphosphate, sodium acetate, strontium oxide or the like, though using trisodium phosphate is preferable.

Further, an organic alkaline compound such as monoethanol amine, triethanol amine, stearyl amine, guanidine, pyridine or the like can also be used.

The alkali treatment is not particularly restricted in its method if it is a method in which at least one alkaline compound selected from the group consisting of alkalis and alkali generating compounds is used under the condition of pH 4–9.

For example, after the acid treatment a supernatant is removed and an appropriate amount of water is then added. Subsequently, an alkaline compound such as sodium hydroxide, trisodium phosphate or the like is added slowly under stirring with a mixer or the like to adjust pH 4–9.

The treating temperature in this occasion is not particularly restricted, though it is usually not less than 20° C., preferably in the range of 50° C.-less than boiling point. The treating time is 0.5–120 min., preferably 10–60 min.

4 After-treatment, etc.

After the alkali treatment supernatant is removed, followed by filtration, washing with water and sufficient drying to give an aimed luminous pigment. The drying condition is not particularly restricted, though usually it may be drying at not less than 20° C. for not less than 2 hours.

The luminous pigment treated, if needed, is put through a sieve to give the luminous pigment with durability in a powder state.

The luminous pigment thus obtained, whose solubility in water 100 g of 40° C. is less than 1 g, has a very good water resistance, and its water resistance is durable and heat resistant, and therefore long use is possible.

5 Use

Although a water resistant luminous pigment thus obtained in accordance with the present invention does not contain a radioactive substance, it is a luminous pigment able to emit light in a dark place for long time and also has a very excellent water resistance. It can be used not only for all use in which a conventional luminous pigment has been employed, but for almost all use in which a conventional dye or pigment has been used as a coloring agent. For example, this pigment is homogeneously dispersed in each kind of ink vehicle, paint vehicle or the like to give a luminous ink or a luminous paint. Using this ink or paint, luminous patterns, letters, figures or the like can be formed or further a luminous paint membrane can be applied toward molded products such as paper, monofilament or multifilament fibers, knitted or woven fabric, nonwoven fabric, synthetic resin film, synthetic resin molded product, glass molded product, ceramics molded product, leather molded product, metal molded product, wood molded product or the like by a printing method such as a gravure, offset, screen or tampo printings, or by a coating method such as a brush painting, hazing painting, dipping, roll coating, knife coating, shower coating or spray coating. Additionally, when a luminous pigment improved by the method of the invention is homogeneously dispersed in an ink vehicle for writing implements, it can also be used as a luminous ink vehicle for writing implements. In adding, each kind of luminous molding product can be obtained by homogenous dispersion in natural resin, semi-synthetic or synthetic resin, or wax, followed by molding.

As to luminous pigments improved by the method of the invention, specific examples for more detailed uses are described in the following, though the use of said luminous pigments is not limited thereto.

(1) Luminous films wherein paint mixed at least with a luminous pigment and a thermoplastic or thermosetting resin (regardless of emulsion, a water soluble type or a solvent soluble type) is coated on a base material such as a synthetic resin film of polyester or the like, paper or synthetic paper. For example, a mark sheet for an evacuation route, a cutting sheet for an evacuation route, a marking sheet for a traffic signal, etc.

(2) Luminous adhesive films wherein a release paper or a release film is temporarily stuck via adhesive to a back side (non coated side) of the above luminous films (1). For example, a mark sheet for an evacuation route, a cutting sheet for an evacuation route, a marking sheet for a traffic signal, etc.

(3) Those of a construction that a white concealment layer is further set between a base material and a luminous pigment layer in the above luminous (adhesive) films (1) and (2).

(4) Those of a construction that a protective layer is further set on a luminous pigment layer in the above luminous (adhesive) films (1), (2) and (3).

(5) Each kind of luminous cutting sheet in which a luminous paint is coated entirely on a basic material having a separation property and a white concealment layer and a hot-melt adhesive layer are set thereon, and each kind of product obtained by a transfer finish of said sheet.

(6) A luminous signal wherein a white concealment layer, a reflective layer, a luminous pigment layer and a glass-bead layer are laminated in this order on a basic material. For example, a traffic signal, an evacuation route signal, etc.

(7) Interior and exterior paints wherein at least a luminous pigment and a thermoplastic or thermosetting resin (regardless of emulsion, a water soluble type or a solvent soluble type) are mixed.

(8) Luminous textiles which are colored exhaustively by dipping yarn, sliver, raw cotton, fabrics, knitting, nonwoven fabrics, web and a sewing product (including those in which a pre-treatment such as cationization is done) sewed by each of these into a liquid-state medium dispersed with a luminous pigment.

(9) Luminous textiles which are obtained by padding yarn, sliver, raw cotton, fabrics, knitting, nonwoven fabrics, web and a sewing product sewed by each of these into a padding bath containing a luminous pigment and a thermoplastic resin.

(10) Clothings such as a jumper, coat, jacket, sweater, blouse, T shirt, trousers, skirt, one-piece, stockings, socks, gloves, cap, hat, handkerchief, towel, tie, skiwear, swimsuit, sportswear, ribbon, muffler and neckerchief, and footwears such as slippers, sandals, shoes and boots, and interior products, miscellaneous goods, toys, stationeries, sport goods or the like such as a curtain, carpet, cushion, shop curtain, national flag, pennant, table cloth, mat, artificial flower, coaster, bag and brief bag wherein a luminous ink for textile printing (an aqueous or vinyl chloride plastisol ink) are printed.

(11) A heat transfer sheet wherein aluminous ink is printed on a base material having a separation property to form patterns, letters, figures, symbols or the like, or the entire surface of the material is colored by said luminous ink, followed by printing or spraying an adhesive on it, and fibers, leather products or plastic products (vinyl chloride products, etc.) in which this sheet is heat-transferred, for example, clothings, interior products, footwears, miscellaneous goods, toys, stationeries, sport goods, mark sheets for an evacuation route, etc.

(12) Monofilaments or multifilaments whose surface is coated with a luminous paint, and a doll hair, wig, fur, embroidery thread or the like which are obtained by these, and further clothings, interior products, footwears, miscellaneous goods or the like which are woven fabrics or knittings of said filaments.

(13) Color master batch in which a luminous pigment is homogeneously dispersed in plastic, color master batch in which said luminous pigment is homogeneously dispersed in wax and plastic, concsol in which said luminous pigment is homogeneously dispersed in vinyl chloride plastisol, and an insert film in which said luminous pigment is printed or painted on a synthetic resin film, and further these are added with plastic for molding, vinyl chloride plastisol or a shape memory resin, followed by an injection molding, vacuum forming, compression molding, foaming, blow molding, extrusion molding, slush molding, calender molding, integral molding or the like to give toys such as a doll, animal, fish, car, ball, imitation food, playing house set or the like, danger inhibiting or protecting elements such as an evacuation light and a hazard display, containers for food, drink and cosmetics such as a plastic cup, plastic bottle, straw or the like, decorations such as an artificial flower, broach, pendent, dial or the like, a decoration film, shrink-film, mark sheet for an evacuation route, miscellaneous goods, stationeries or the like, and further filaments in which the above master batch or concsol is applied to a melt spinning or an extrusion spinning, and a doll hair, wig, fur, stuffed toy, carpet, curtain or the like which are obtained by said filaments, and clothings, interior products, footwears, miscellaneous goods or the like which are obtained by woven fabrics or knittings of said filaments.

(14) A coating cloth in which a luminous paint is coated on a cloth, and clothings, interior products, footwears, miscellaneous goods or the like which are obtained by this cloth, or a luminous paint or ink is coated or is printed on a paper or a plastic film to give a color paper, artificial flower, paper cup, name card, book, picture book, wallpaper, calendar, wrapping paper, mark sheet for an evacuation route or the like.

(15) Plastic products, metal products, glass products or ceramics in which a luminous pigment is painted, for example, toys such as a car, miniature car, animal, doll, playing house set, imitation food or the like, containers for food, drink and cosmetics, a shape memory metal molding or a shape memory resin molding, each kind of pre-paid card, a dial, an evacuation light, a mark sheet for an evacuation route or the like.

(16) Glass products, ceramics, plastic products or metal products in which a luminous ink is applied to a screen printing or a gravure printing, for example, containers for food, drink and cosmetics such as a glass cup, glass bottle, aluminum can, glass, beer mug, mug, tea cup, plastic cup, plastic bottle or the like, decorations, miscellaneous goods, toys and stationeries such as a broach, badge, name card, various cards, pen case, eraser, bag, dial or the like, a mark sheet for an evacuation route or the like.

(17) Plastic products, metal products, glass products or ceramics, in which a luminous tampo ink is applied to printing, for example, toys such as a doll, animal, car or the like, containers for food, drink and cosmetics, decorations, stationeries and miscellaneous goods such as a broach, badge, name card, various cards, dial or the like, an evacuation light, a mark sheet for an evacuation route or the like.

(18) Writing implements such as a ball-point, felt-tip, Magic Marker, colors or the like where in aluminous ink for writing implements is filled.

(19) Flour clay, plastic clay, slime resin (highly viscous fluid), shape memory resin, candles, crayon or the like wherein a luminous pigment is homogeneously dispersed.

(20) A tack seal wherein patterns, letters, figures, symbols or the like are formed on a base material using a luminous ink, followed by laminating a transparent film on the surface via an adhesive and by affixing a release paper on a back side of the base material via an adhesive, and clothings, miscellaneous goods, toys, stationeries, mark sheets for an evacuation route and the like in which this seal is affixed.

(21) A water transfer sheet wherein an adhesive is printed on a base material having a separation property, followed by forming patterns, letters, figures, symbols or the like on it by a luminous ink, and further by setting a cover coat layer on this, and plastic products, glass products, ceramics or metal products in which this sheet is water-transferred, for example, containers for food, drink and cosmetics such as a glass cup, glass bottle, wine glass, beer mug, mug, plastic cup, plastic bottle or the like, and miscellaneous goods, toys, stationeries, an evacuation light, a mark sheet for an evacuation route or the like.

(22) A flocked cloth wherein a luminous paint is coated on a cloth, followed by flocking short filaments on it, and each kind of clothing, interior products, footwears, miscellaneous goods and the like such as a stuff toy, carpet or the like.

(23) A flocking transfer sheet wherein short filaments are flocked on a basic material having a separation property, followed by printing a luminous ink on the surface of this, then by printing an adhesive to form patterns, letters, figures and symbols on said ink layer, and fiber products, leather products, plastic products and the like in which this sheet is transferred, for example, clothings, footwears, interior products, miscellaneous goods, toys, stationeries and the like.

(24) A highpile knit wherein yarn consisting of a monofilament or a multifilament dipped with a luminous paint is entangled in a netlike base material, followed by backing the back side with an adhesive, and each kind of clothing, interior products, footwears, miscellaneous goods and the like comprising a stuff toy, doll hair, wig, carpet and the like which are obtained from this.

(25) A luminous print cloth with excellent moisture permeability wherein a pattern layer is formed by using a luminous ink on a part of one side of a base material consisting of a transparent synthetic filament, followed by forming a porous coating layer by a paint containing a polyurethane resin in a base material having the pattern layer, and clothings, interior products, miscellaneous goods and the like using this cloth.

Further, into the above ink, paint, plastic and the like can appropriately be mixed according to use each kind of agent, for example, a surfactant, dry adjusting agent, antifoaming agent, crosslinking agent, catalyst, viscosity adjusting agent, dye, pigment, fluorescent pigment, fluorescent dye, filler pigment, thermochromic material, photochromic material, pearl pigment, glass bead, metal powder, preservative, antistatic agent, foaming agent, fire retardance agent, UV absorbing agent, UV stabilizer, antioxidant, anti-soiling agent, plastic stabilizer, slip additive, water repellent oil repellent, flavoring, perfume, antimicrobial, deodorizing agent, insecticide, repellent, photocatalyst, anti-aging agent or the like.

In the following, the invention will further be illustrated based on the examples, but the invention is not limited to these. Further, in the following, "%" means "% by weight" unless otherwise specified.

EXAMPLES

The examples and the comparative examples were carried out by the following treatment steps.

However, in the examples (and comparative example 3) each treatment of the following steps (a), (c) and (d) was carried out, though the washing treatment of the step (b) was not carried out.

On the other hand, in the comparative examples 1 and 2, each treatment of the below steps (a),(b) and (d) was carried out, though the alkali treatment of the step (c) was not carried out.

In the following the steps (a)–(d) are explained.

(a) Acid Treatment

Water of 480 g and 89% phosphoric acid of 20 g were added into a 1000 ml beaker, stirred, and adjusted to pH 2. Under stirring this solution, 100 g of luminous pigment (N Yakou G-300M: manufactured by Nemoto Tokushu Kagaku, Co., Ltd.; in which the metal oxide matrix is strontium aluminate and Eu and Dy are doped were added slowly and dispersed homogeneously. Subsequently, said solution was warmed to 70° C. under stirring and stirred further for 20 min. at this temperature.

(b) Washing Treatment

The phosphoric acid treatment liquid of the above step (a) was cooled to ordinary temperature, followed by filtration. The obtained filtrate was washed with warm water of 1 kg of 30–50° C. and then filtered. This circuit washing treatment was repeated 5 times.

(c) Alkali Treatment

The phosphoric acid treatment liquid of the above step (a) was allowed to stand for 4 hours, and then 300 g of supernatant were removed, followed by addition of 300 g of water. Aqueous trisodium phosphate solution of 10% or aqueous sodium hydroxide solution of 30% was added slowly under stirring said solution and adjusted to pH 4–10.

Said alkaline treatment liquid was then kept standing for 4 hours, and the supernatant was removed. Then said liquid was filtered, and the cake was washed with water of 1 kg.

(d) Drying Treatment

The luminous pigment obtained by the above steps (b) or (c) was dried in a drier of 80° C. for 12 hours and then filtered through a sieve of 180 mesh to provide a power of luminous pigment. Further, in order to investigate whether the increase of water resistance by the acid treatment is obtained or not, each solubility of the luminous pigments which differed in the point whether the acid treatment is allowed or not, was measured.

Solubility of the luminous pigment without the acid treatment was not less than 10 g against 100 g of warm water at 40° C., and on the contrary, solubility of the luminous pigment with the acid treatment was less than 0.01 g.

Therefore, it was found that water resistance of the luminous pigment was tremendously increased by the acid treatment.

Water resistance (durability) test a. Test Method

A luminous pigment of 5 g improved in the examples or the comparative examples and water of 45 g were added into a container of 50 cc and stirred to give a sample. This sample was placed in a drier of 60° C., and the color, re-dispersion, presence or absence of emission of the sample, and pH of water were investigated once a day, and abnormality of water resistance was ascertained.

b. Conclusion

When pH of water became alkaline, the color of the luminous pigment changed to yellow, and the luminous pigment could not disperse again and solidified, whereby the luminance decreased to not more than half.

The reason for such conversion of the luminous pigment is estimated due to the fact that alkaline earth metal oxide of said pigment component reacted with water to give alkaline hydroxide and dissolved in water (pH of water becomes alkaline owing to this), resulting to a change of the pigment component.

Therefore, the conclusion of water resistance (durability) was judged whether pH of a test liquid became alkaline or not.

Comparative Example 1

Time for the acid treatment of the step (a) was made 5 min., and each treatment of the steps (a), (b) and (d) was carried out.

On the 5th day, the pH value of a test liquid became 12, and the water resistance was lost.

Comparative Example 2

Except that time for the acid treatment of the step (a) was made 20 min., the same treatment as that of the comparative example 1 was carried out.

On the 12th day, the pH value of a test liquid became 12, and the water resistance was lost.

Example 1

Each treatment of the steps (a), (c) and (d) was carried out.

However, time for the acid treatment of the step (a) was 20 min., and the alkali treatment of the step (c), in which 10% aqueous trisodium phosphate solution of 27 g were used, was carried out adjusting to the condition of pH 4.

On the 30th day, the pH value of a test liquid was 5, and the water resistance was kept.

Example 2

Each treatment of the steps (a), (c) and (d) was carried out.

However, time for the acid treatment of the step (a) was 5 min., and the alkali treatment of the step (c), in which 10% aqueous trisodium phosphate solution of 42 g were used, was carried out adjusting to the condition of pH 5.

On the 30th day, the pH value of a test liquid was 5, and the water resistance was kept.

Example 3

Except that the alkali treatment of the step (c), in which 10% aqueous trisodium phosphate solution of 45 g were used, was carried out adjusting to the condition of pH 5, the same treatment as that of the example 1 was carried out.

On the 30th day, the pH value of a test liquid was 5, and the water resistance was kept.

Example 4

Except that time for the acid treatment of the step (a) was 40 min., and the alkali treatment of the step (c), in which 10% aqueous trisodium phosphate solution of 43 g were used, was carried out adjusting to the condition of pH 5, the same treatment as that of the example 1 was carried out.

On the 30th day, the pH value of a test liquid was 5, and the water resistance was kept.

Example 5

Except that the alkali treatment of the step (c), in which 10% aqueous trisodium phosphate solution of 63 g were used, was carried out adjusting to the condition of pH 6, the same treatment as that of the example 1 was carried out.

On the 30th day, the pH value of a test liquid was 5, and the water resistance was kept.

Example 6

Except that the alkali treatment of the step (c), in which 10% aqueous trisodium phosphate solution of 136 g were used, was carried out adjusting to the condition of pH 7, the same treatment as that of the example 1 was carried out.

On the 30th day, the pH value of a test liquid was 6, and the water resistance was kept.

Example 7

Except that the alkali treatment of the step (c), in which 30% aqueous sodium hydroxide solution of 1.8 g were used, was carried out adjusting to the condition of pH 4, the same treatment as that of the example 1 was carried out.

On the 30th day, the pH value of a test liquid was 4, and the water resistance was kept.

Example 8

Except that the alkali treatment of the step (c), in which 30% aqueous sodium hydroxide solution of 3.2 g were used, was carried out adjusting to the condition of pH 5, the same treatment as that of the example 1 was carried out.

On the 30th day, the pH value of a test liquid was 5, and the water resistance was kept.

Comparative Example 3

Except that the alkali treatment of the step (c), in which 30% aqueous sodium hydroxide solution of 10 g were used, was carried out adjusting to the condition of pH 10, the same treatment as that of the example 1 was carried out.

On the 2nd day, the pH value of a test liquid became 12, and the water resistance was lost.

From the above results it is evident that the luminous pigment of the invention has water resistance with durability and has an excellent characteristics that the water resistance is kept at high temperature for long periods of time.

Industrial Applicability

The luminous pigment of the invention has water resistance with durability and has an excellent characteristics that the water resistance is kept at high temperature for long periods of time.

Therefore, the luminous pigment of the invention can be used not only under circumstances of water and high temperature, but under severe circumstances of high temperature and high humidity. Since its application range is extremely wide, its usefulness is extremely large.

Furthermore, since the improved process of the invention can be carried out in an extremely simple way of the acid treatment and the alkali treatment without using a special material or equipment, it is also economically excellent.

What is claimed is:

1. A process for preparing a water resistant luminous pigment, characterized in that a luminous pigment, in which an oxide matrix comprising at least one element selected from the group consisting of Mg, Ca, Sr, Ba and Zn and at least one element selected from the group consisting of B, Al, P and Ga is doped with at least one rare-earth metal element, is acid treated under the condition of a pH of not more than 3 using at least one acidic compound selected from the group consisting of acids and acid generating compounds, and is subsequently given an alkaline treatment under the condition of a pH of 4–9 using at least one alkaline compound selected from the group consisting of alkalis and alkali generating compounds.

2. A process for preparing a water resistant luminous pigment according to claim 1, wherein the luminous pigment has the following formula:

in which

M is at least one element selected from the group consisting of Ca, Sr and Ba;

R is at least one element selected from the group consisting of Tb, Dy, Nd, Eu and Tm.

3. A process for preparing a water resistant luminous pigment according to claim 2, wherein R comprises at least one element selected from the group consisting of Tb, Dy, Nd and Tm.

4. A process for preparing a water resistant luminous pigment according to claim 1, wherein the acidic compound is at least one compound selected from the group consisting of phosphoric acid, phosphorous acid, polyphosphoric acid, sodium dihydrogenphosphate or sulfuric acid.

5. A process for preparing a water resistant luminous pigment according to claim 1, wherein the alkaline compound is at least one compound selected from the group consisting of sodium hydroxide, potassium hydroxide, calcium hydroxide, strontium hydroxide, lithium hydroxide, trisodium phosphate or strontium oxide.

6. A process for preparing a water resistant luminous pigment according to claim 2, wherein the acidic compound is at least one compound selected from the group consisting of phosphoric acid, phosphorous acid, polyphosphoric acid, sodium dihydrogenphosphate or sulfuric acid.

7. A process for preparing a water resistant luminous pigment according to claim 3, wherein the acidic compound is at least one compound selected from the group consisting of phosphoric acid, phosphorous acid, polyphosphoric acid, sodium dihydrogenphosphate or sulfuric acid.

8. A process for preparing a water resistant luminous pigment according to claim 2, wherein the alkaline compound is at least one compound selected from the group consisting of sodium hydroxide, potassium hydroxide, calcium hydroxide, strontium hydroxide, lithium hydroxide, trisodium phosphate or strontium oxide.

9. A process for preparing a water resistant luminous pigment according to claim 3, wherein the alkaline compound is at least one compound selected from the group consisting of sodium hydroxide, potassium hydroxide, calcium hydroxide, strontium hydroxide, lithium hydroxide, trisodium phosphate or strontium oxide.

10. A process for preparing a water resistant luminous pigment according to claim 4, wherein the alkaline compound is at least one compound selected from the group consisting of sodium hydroxide, potassium hydroxide, calcium hydroxide, strontium hydroxide, lithium hydroxide, trisodium phosphate or strontium oxide.

* * * * *